Feb. 26, 1924. 1,484,977
J. P. WARDEN
PNEUMATIC TIRE DEFLATOR
Filed May 31, 1922
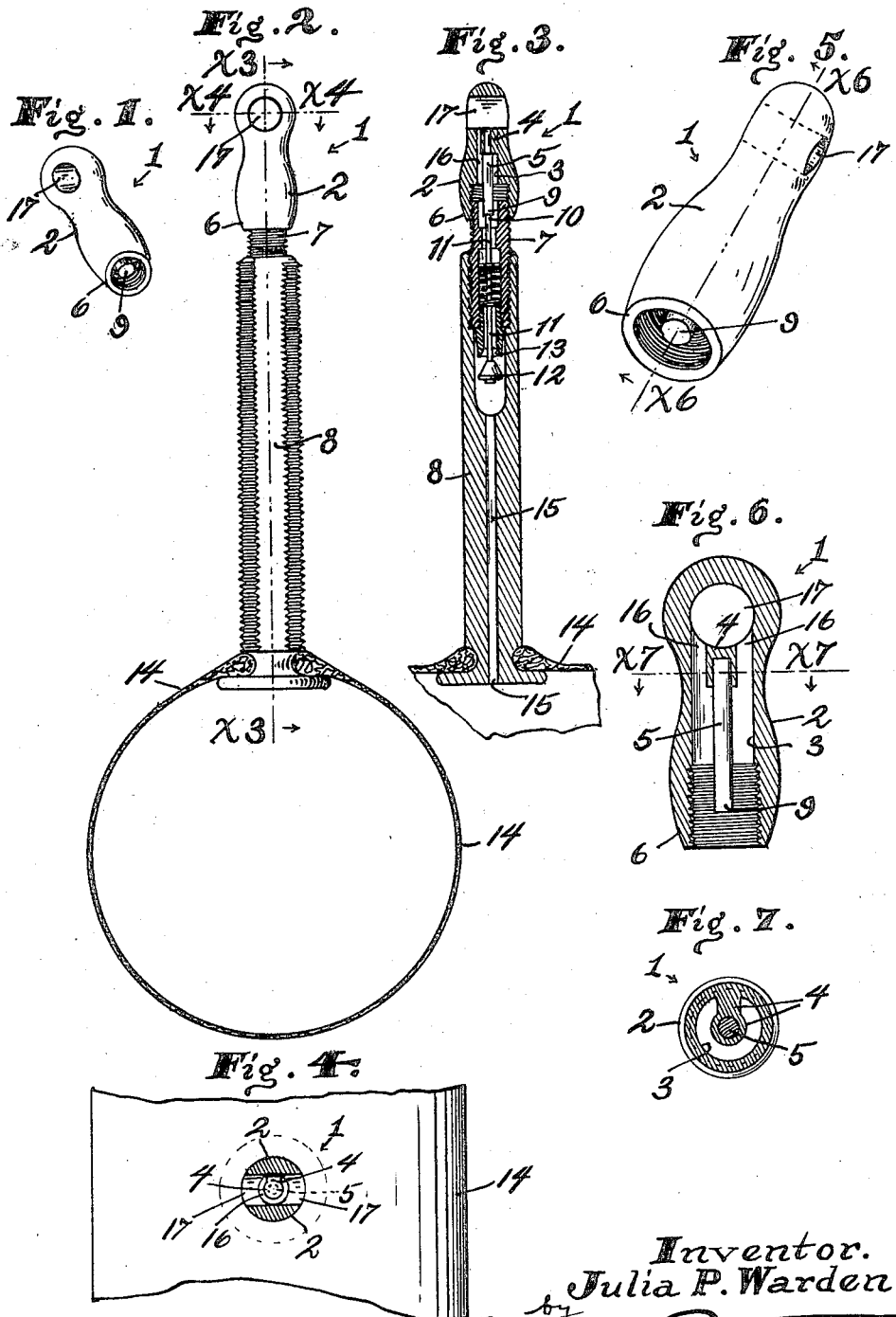
Inventor.
Julia P. Warden.
by James R. Townsend
her atty.
Witness:
W. M. Gentle.

Patented Feb. 26, 1924.

1,484,977

UNITED STATES PATENT OFFICE.

JULIA P. WARDEN, OF SOUTH PASADENA, CALIFORNIA.

PNEUMATIC-TIRE DEFLATOR.

Application filed May 31, 1922. Serial No. 564,897.

*To all whom it may concern:*

Be it known that I, JULIA P. WARDEN, a citizen of the United States, residing at South Pasadena, in the county of Los Angeles and State of California, have invented a new and useful Pneumatic-Tire Deflator, of which the following is a specification.

An object of this invention is to provide a tire deflator that is simple and durable in construction and effective in operation. Heretofore it has been a tedious task consuming considerable time to deflate tire tubes so that the tire may be removed or so the inner tube can be folded flat for packing away. Usually manual means are employed for this purpose, that is, when a tire tube has been tested and ready to fold and pack the operator has had to use a small prod to manually hold the valve open until the air has fully escaped; which is not only a tedious process but consumes valuable time in which the operator could be otherwise employed.

It only requires a moment's time for my appliance to be attached so that it will hold the valve open, after which the operator can engage in other work while the tire deflates; and an object of this invention is to provide means for saving time and labor.

An object of the invention is to provide a small, neat appliance that can be detachably connected to any standard tire tube valve casing for deflating the tube.

Other objects, advantages and features of invention may appear from the accompanying drawing, the subjoined detail description and the appended claim.

The invention may be carried out in various forms.

The accompanying drawing illustrates the invention in the form at present deemed most desirable.

Figure 1 is a perspective view of the tire deflator about actual size.

Fig. 2 is a sectional elevation of a tire tube with the tire deflator attached to the valve stem.

Fig. 3 is a section on line $x^3$, Fig. 2.

Fig. 4 is a cross section on line $x^4$, Fig. 2.

Fig. 5 is a perspective view of the tire deflator enlarged to about twice actual size.

Fig. 6 is a section on line $x^6$, Fig. 5.

Fig. 7 is a cross section on line $x^7$, Fig. 6.

The tire deflator 1 comprises a body 2 which may be a hollow casting that has integrally connected to its inner walls 3 a boss 4 in which is seated one end of a push rod 5; which in the form shown is cast into the body 2 although it may be screwed into the boss or secured thereto in any manner. Rod 5 is central and in longitudinal alignment with the axis of body 2 and extends from boss 4 to near the bottom threaded end of body 2 so that when attached to the threaded end 7 of tire valve casing 8 the free end 9 of rod 5 will contact with the end 10 of the valve stem 11 and hold the valve 12 off the valve seat 13 so that air in the tire tube 14 can escape through the passages 15, 16, 17 to the outer air.

The tire deflator 1 is constructed so that it can be attached to any standard tire valve casing so that it will hold the valve open.

In practice the cap ordinarily covering the threaded end 7 of a valve casing 8 is removed; and then the deflator 1 screwed into its place until the end 9 of rod 5 contacts with the valve stem 10 and holds the valve 12 in open position so that a tire tube to which it is connected will automatically deflate.

The passage 17 affords a convenience for securing the device to a key ring or for suspending it by a cord, and also may serve to receive a nail or other device, which may act as a handle in case of screwing the device onto or off the threaded end 7 of the valve stem casing.

I claim:

A pneumatic tire deflator comprising a hollow body adapted to be detachably connected to the valve casing of a tire tube; a boss 4 integral with said body, said boss extending inwardly from the inner wall toward the longitudinal axis of said body and arranged to have an air passage 16 between said boss and the inner wall of said body; and a rod secured to said boss, said rod adapted to open the valve in the casing of the tire tube when said body is attached thereto, said body provided with an air passage 17 that is connected to the air passage 16 so that air from a tube can escape through the passages of said body.

In testimony whereof, I have hereunto set my hand at Los Angeles, California, this 22nd day of May, 1922.

JULIA P. WARDEN.

Witness:
  JAMES R. TOWNSEND.